(12) United States Patent
Peloquin et al.

(10) Patent No.: US 6,449,705 B1
(45) Date of Patent: Sep. 10, 2002

(54) METHOD AND APPARATUS FOR IMPROVING PERFORMANCE OF DRIVE LINKING THROUGH USE OF HASH TABLES

(75) Inventors: Mark A. Peloquin, Austin; Benedict Michael Rafanello; John Cameron Stiles, both of Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,832

(22) Filed: Sep. 9, 1999

(51) Int. Cl.⁷ .............................................. G06F 13/00
(52) U.S. Cl. ...................... 711/173; 711/153; 711/209; 711/216
(58) Field of Search ................................ 711/173, 153, 711/203, 216, 209, 202; 714/15, 710; 360/48, 51

(56) References Cited

U.S. PATENT DOCUMENTS

| | | | | |
|---|---|---|---|---|
| 4,601,012 A | * | 7/1986 | Aiken, Jr. .................... | 714/15 |
| 4,825,321 A | * | 4/1989 | Hassel et al. ................ | 360/51 |
| 4,858,034 A | * | 8/1989 | Hassel et al. ................ | 360/51 |
| 5,129,088 A | * | 7/1992 | Auslander et al. ............ | 711/1 |
| 5,271,018 A | * | 12/1993 | Chan ........................... | 714/710 |
| 5,355,259 A | * | 10/1994 | Shih ............................ | 360/48 |
| 5,602,686 A | * | 2/1997 | Shih ............................ | 360/48 |
| 5,675,769 A | * | 10/1997 | Ruff et al. ................... | 711/173 |
| 5,706,472 A | * | 1/1998 | Ruff et al. ................... | 711/173 |
| 5,721,858 A | * | 2/1998 | White et al. ................. | 711/203 |
| 6,088,778 A | * | 7/2000 | Ruff et al. ................... | 711/173 |

* cited by examiner

*Primary Examiner*—David Hudspeth
*Assistant Examiner*—Fred F. Tzeng
(74) *Attorney, Agent, or Firm*—Duke W. Yee; Jeffrey S. LaBaw; Stephen R. Loe

(57) ABSTRACT

A method for routing an input/output request for a particular logical volume. In a preferred embodiment, partitions are assigned to logical volumes, wherein an arbitrary number of partitions can be assigned to a logical volume and the partitions can be of an arbitrary size. Each logical volume is divided into a plurality of zones, wherein the zones for a particular logical volume are substantially equal in size. A zone table is created whose entries contain data about one or two partitions that correspond to that zone. Responsive to receiving an input/output request directed to a logical volume, the zone table entries for a first and a last sector listed in the input/output request are used to determine to which partitions in the logical volume the input/output request should be routed.

27 Claims, 5 Drawing Sheets

METHOD AND APPARATUS FOR IMPROVING PERFORMANCE OF DRIVE LINKING THROUGH USE OF HASH TABLES

BACKGROUND OF THE INVENTION

1. Technical Field

The present invention relates generally to the field of computer software and more specifically to managing disk drive linking through the use of hash tables.

2. Description of Related Art

Computers utilize a wide variety of memory devices to store data. One generic type of memory device is typically referred to as a disk. Disks are classified according to the storage medium employed, such as an "optical" disk or a "magnetic" disk. Disks are also generally classified as either "floppy" or "hard." Hard disks generally have greater storage capacity, faster data access times, and longer useful lives than floppy disks. However, unlike hard disks, floppy disks are removable and portable. That is floppy disks are easily released from, and reattached to, a disk drive, which provides the computer with access to the data on the disk.

Disks are physically divided up into heads, cylinders, and sectors. Although a sector may be identified by specifying a head, a cylinder, and a sector within the cylinder, a sector may also be identified by a "logical sector address." Each logical sector address is a single number rather than a triplet of numbers. The logical address of a sector corresponds to the number of sectors between the addressed sector and the "first" sector on the disk along some specified path which traverses all available sectors in order. The first sector is usually known as "sector zero."

Disks are also classified by rules governing the physical organization of data on the disk. Many disks mold the available space into one or more "partitions" by a "partition table" located on the disk. The partition table includes partition identifiers. Each partition identifier includes a starting address, which is the physical sector address of the first sector in the partition in question, and an ending address, which is the physical sector address of the last sector in the partition. These partitions may be linked together to provide a unified storage mechanism for the host computer or network.

Sometimes, more than one drive is linked together to provide storage to a computer or a network of computers. A drive linking algorithm maintains a list of the drives and/or partitions being linked. When an input/output request is received, this list is searched sequentially to determine which drive (or partition) the input/output request is to be routed to. If an input/output request crosses a boundary (i.e. part of the input/output request needs to be routed to one drive (or partition) and part of the input/output request needs to be routed to a second drive (or partition)), the input/output request must be broken up into two (or more) requests. As the average number of links in the list increases, the average performance of the linked entity as a whole decreases, and data written to and read from drives (or partitions) which appear later in the list occurs slower than for drives (or partitions) which appear earlier in the list. Therefore, it is desirable to have a method of linking drives and/or partitions that stabilizes access to the drives and/or partitions such that the performance of the system is constant regardless of the number of drives and/or partitions being linked without having to place any restrictions on the size or number of drives and/or partitions being linked.

SUMMARY OF THE INVENTION

The present invention provides a method for routing an input/output request for a particular logical volume. In a preferred embodiment, partitions are assigned to logical volumes, wherein an arbitrary number of partitions can be assigned to a logical volume and the partitions can be of an arbitrary size. Each logical volume is divided into a plurality of zones, wherein the zones for a particular logical volume are substantially equal in size. A zone table is created, whose entries contain data about one or two partitions that correspond to that zone. Responsive to receiving an input/output request directed to a logical volume, the zone table entries for a first and a last sector listed in the input/output request are used to determine to which partitions in the logical volume the input/output request should be routed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
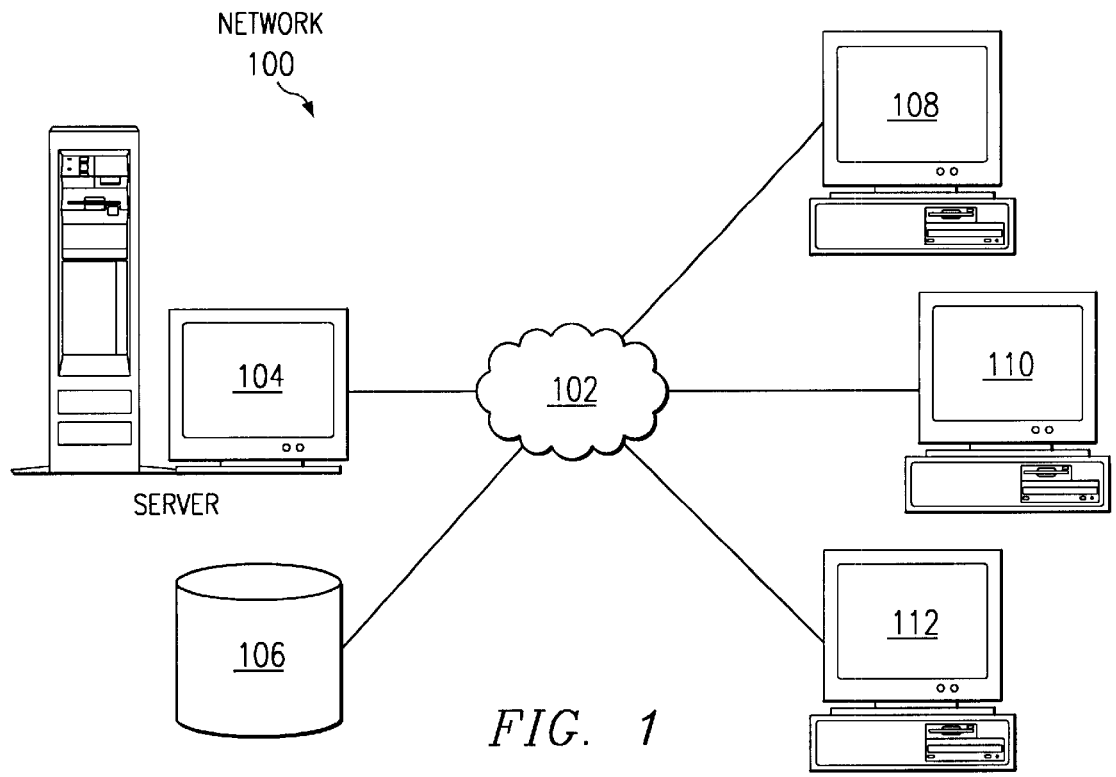
FIG. 1 depicted a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections such as those made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
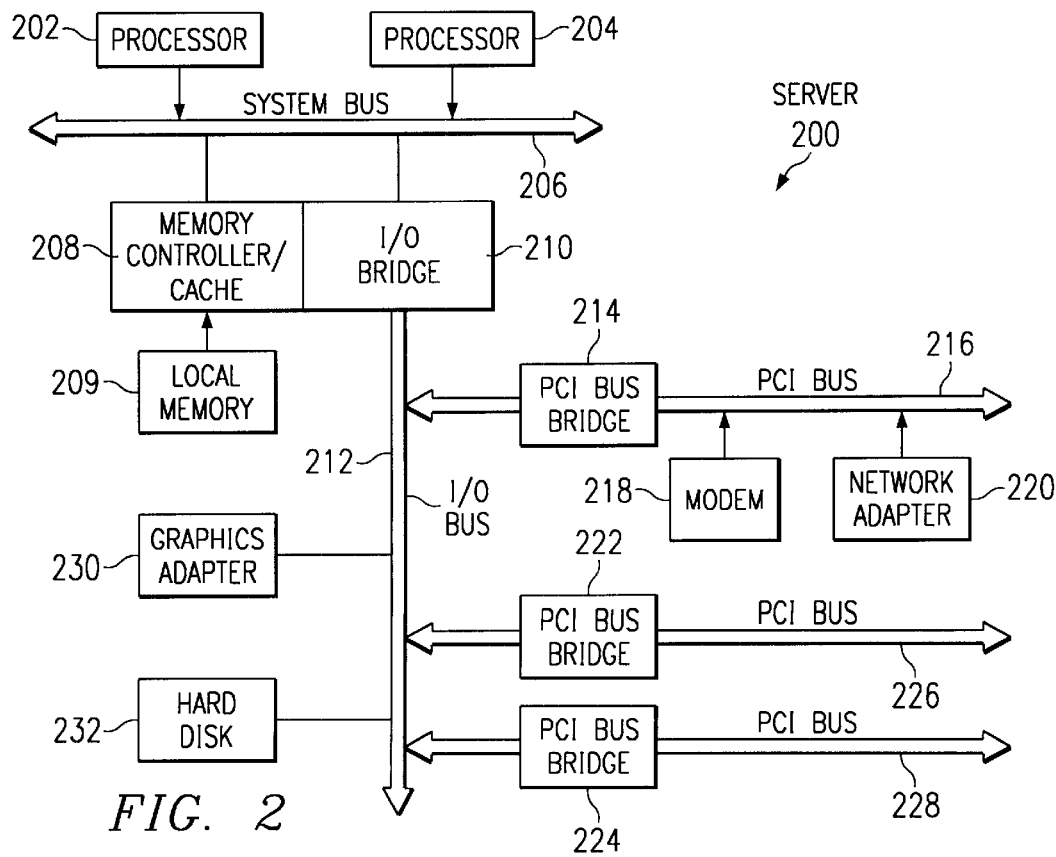
FIG. 2 depicts a block diagram of a data processing system that may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
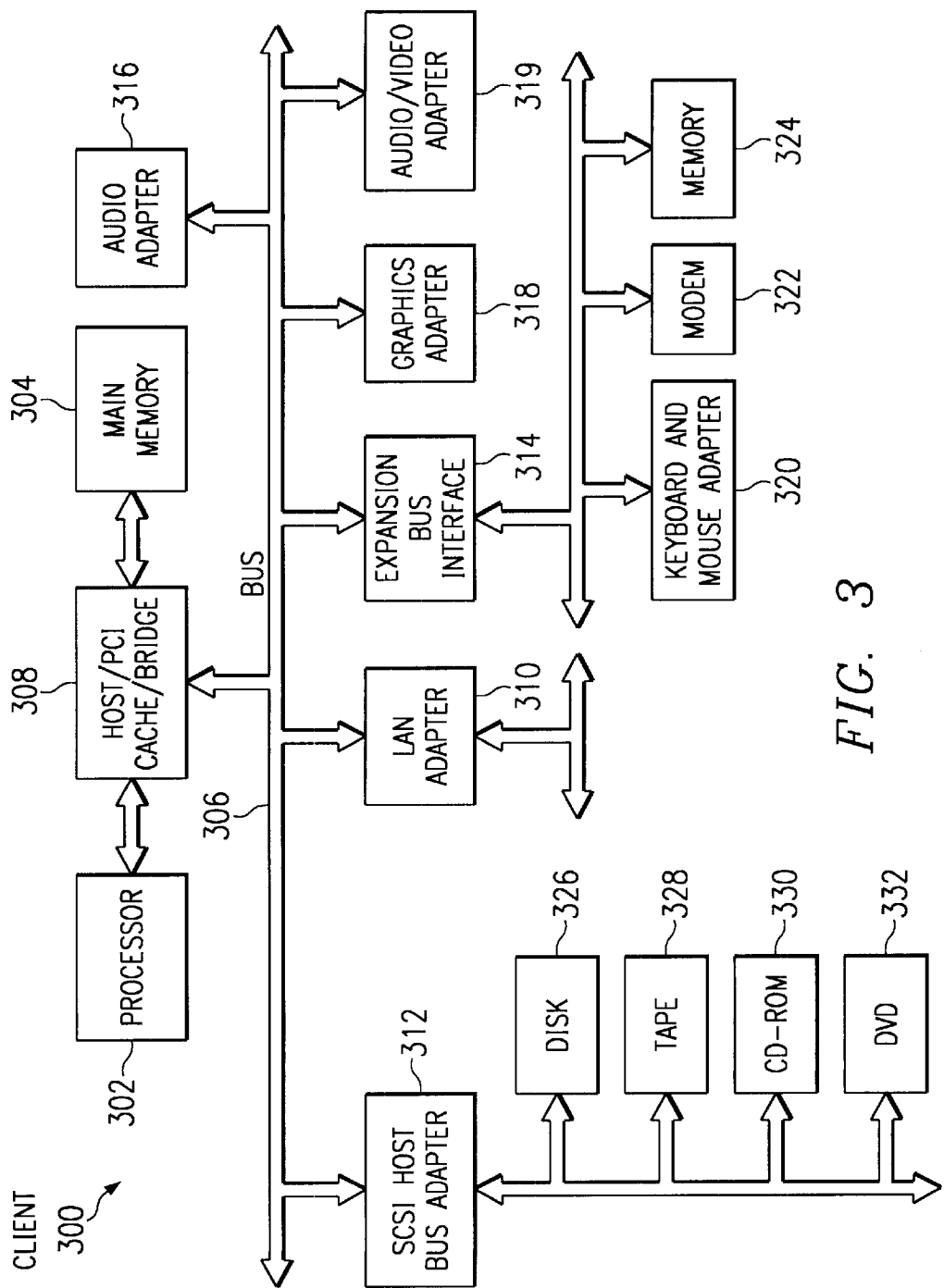
FIG. 3 illustrates a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Before proceeding further, it will prove useful to define certain terminology used herein.

A "sector" is the smallest unit by which data is addressed physically on a disk surface. Each sector occupies a specific physical position relative to an index location on a disk, and has the property that it is available for reading or writing once per disk rotation.

Sectors are grouped together hierarchically for addressing purposes. First, a disk surface is divided into one or more "cylinders." In turn, cylinders are divided into "tracks."

A "track" is a logical entity comprising a set of sectors occupying contiguous logical disk locations.

A "cylinder" is a logical entity representing a collection of tracks which can be selected via an operation with latencies less than the minimum "seek" time. Cylinders have the additional property that the selection of a new cylinder requires the longest average head-positioning operation.

The terms track and cylinder simply relate collections of sectors to each other as a function of access time considerations. They are independent of physical organization or construction of the device.

The "sector number" portion of a sector address is always the low order portion. The "track number" portion of a specific sector address is always the middle portion of that address between the cylinder and sector portions. The "cylinder number" portion of a specific sector address is always the highest order portion of that address.

A "physical sector number" ("PSN") is a number which identifies a sector's physical position within the set of sectors on a mass storage device.

A "logical sector number" ("LSN") is a number identifying a sector's relative position within the set of sectors directly accessible to the host.

Figure 4:
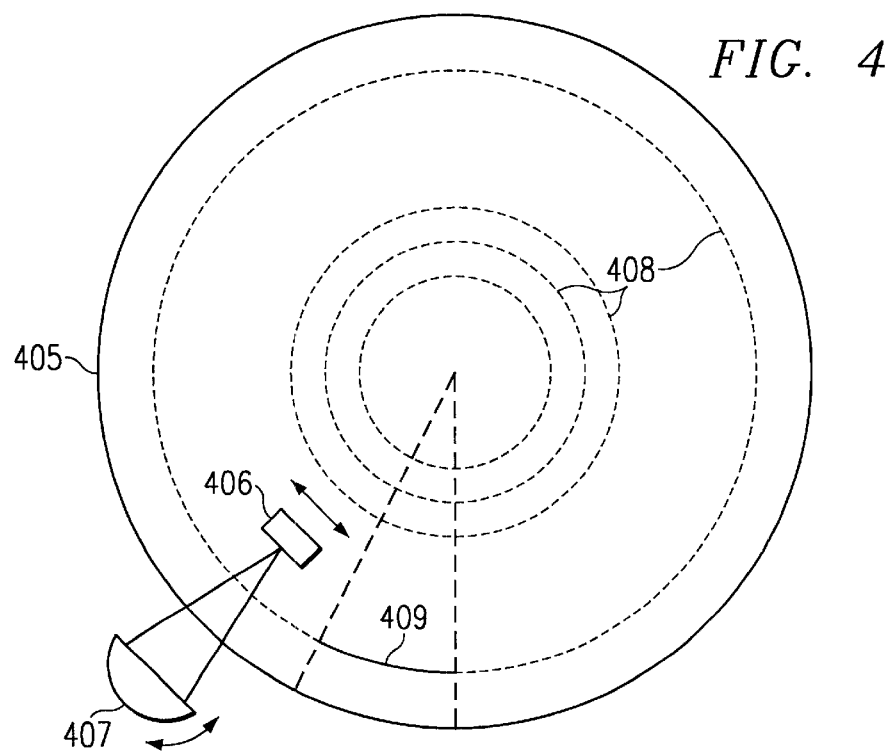
FIG. 4 shows a block diagram of a memory storage disk that may be implemented as a disk in accordance with the present invention.

Turning now to FIG. 4, there is shown a block diagram of a memory storage disk that may be implemented as disk 326 in accordance with the present invention. The sector is the basic addressable unit of the disk 405 as shown in FIG. 4. Disk 405 is a circular platter having a coating of a ferromagnetic material on a rigid substrate. For reading information from the disk or writing information to the disk, a transducer head 406 is positioned by an actuator 407 over one of a number of concentric bands whose center lines are indicated by the numerals 408. Each "sector", such as sector 409, is an arcuate segment of such a band, of finite extent. Every sector is written in a predetermined format, which includes a header, data bytes, error detecting code and error correcting code. Each header is, in turn, a 32-bit quantity that contains the logical address of the sector. There are four copies of the header in every sector. The data bytes are application-specific information recorded on the disk by host and subsystem input/output operations. By convention, there are either 512 or 576 bytes of data in every sector, when standard formats are employed. Sector layout is described in greater detail below.

"Tracks" and "cylinders" are collections of sectors grouped into a hierarchy of categories according to access time latencies. Access time to any sector on a track is a linear function of the distance of that sector from the current sector which is under the read/write head, if on the same track. The first sector on the track immediately follows the last sector with respect to access time considerations. These properties constrain a track into the logical (but not necessarily physical) structure of a ring.

Customarily, in a disk drive, a single head-positioning actuator will be used to position multiple read/write heads which are separated from each other by a fixed distance. When instructed to read or write, a controller determines which of the heads services the addressed portion of the disk and uses that head to perform the operation.

Figure 5:
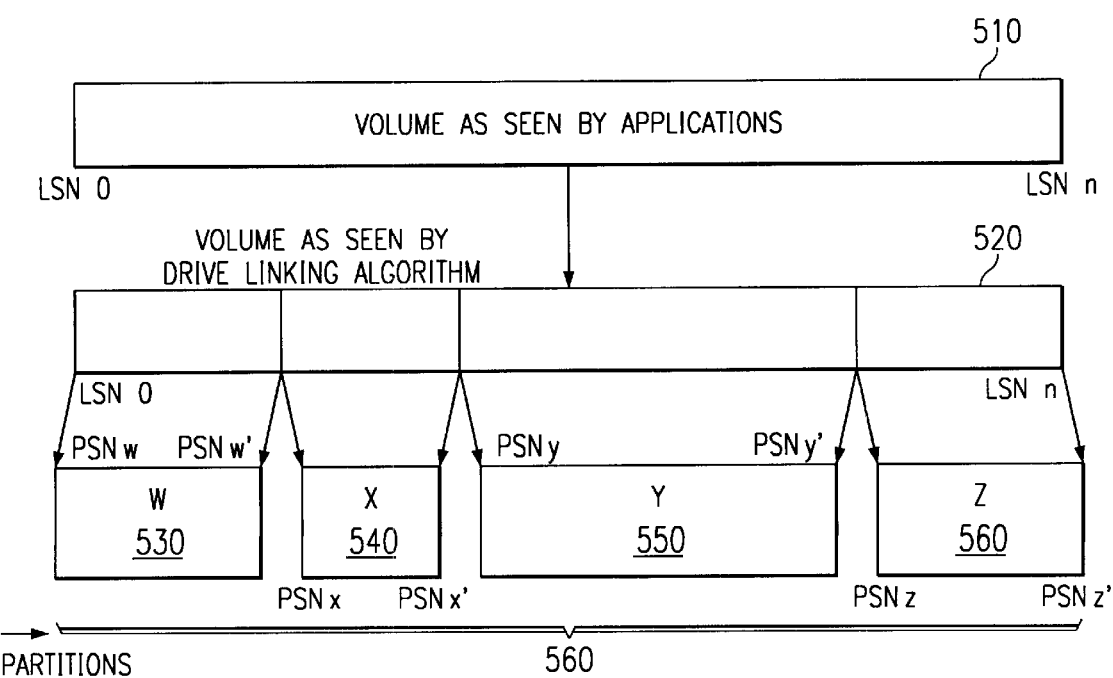
FIG. 5 shows a block diagram illustrating the conventional mapping of the volume as seen by applications to the physical disk.

Turning now to FIG. 5, there is shown a block diagram illustrating the conventional mapping of the volume to the physical disk. The volume 510 as seen by applications, consists of contiguous sectors numbered 0 through n, where n is one less than the number of sectors in the volume. The sectors in a volume are called logical sectors, and the sector numbers assigned to them are called logical sector numbers ("LSN"). Application programs will issue input/output requests against a volume, specifying the logical sector numbers of the sectors they wish to read or write. It is the role of the drive linking algorithm to translate input/output requests against a volume into input/output requests against the partitions which comprise the volume.

To the drive linking algorithm, a volume appears as an ordered collection of partitions such that each logical sector in the volume corresponds to a single physical sector residing in one of the partitions. This allows the drive linking algorithm to map logical sectors in the volume to physical sectors, and is the basis for translating input/output requests. This can be seen in FIG. 5, where volume 520 consists of partitions W 530, X 540, Y 550 and Z 560. Each partition 530, 540, 550, and 560 is identified by a first and last physical section number ("PSN"). For partition W 520, the first PSN is PSN w and the last PSN is PSN w'. As there are no restrictions on where these partitions may reside, these partitions may all reside on the same physical disk, or they may each reside on a different physical disk, or any combination thereof.

Figure 6:
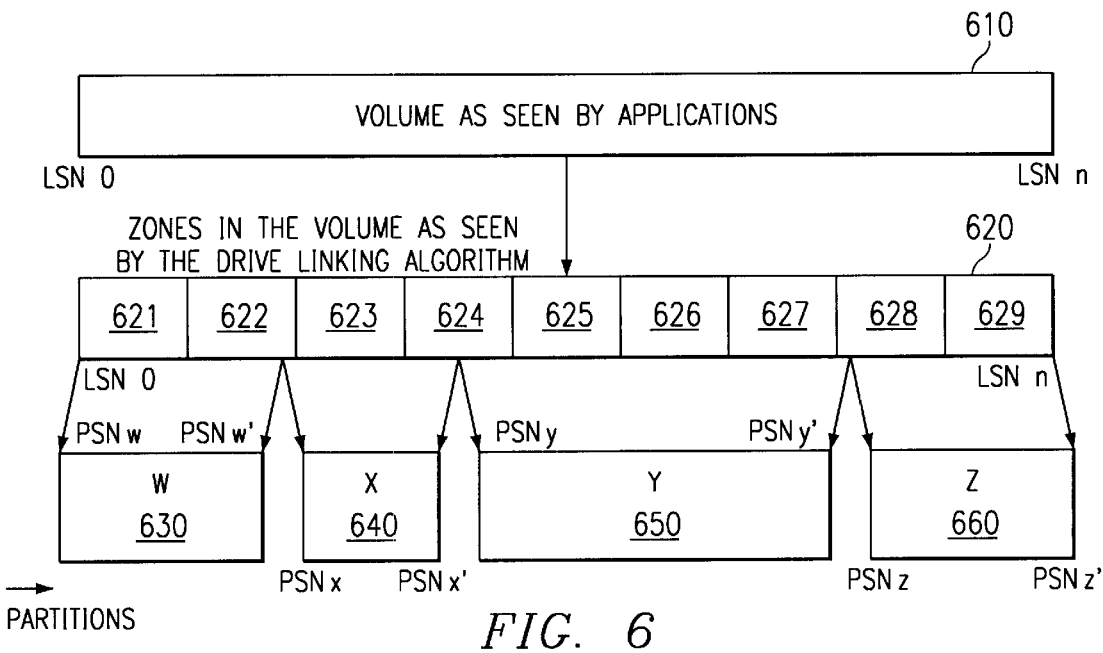
FIG. 6 shows a block diagram illustrating the mapping of a volume to the physical disk where the volume has been divided into zones.

In a preferred embodiment of the present invention, as illustrated in FIG. 6, the volume 610 as seen by applications has not changed. The volume 620 as seen by the drive linking algorithm has changed. It is now divided up into zones 621–629 and a zone table is created. Each entry in the zone table represents a zone. The size of a zone is a power of 2, and every zone is the same size (except the last one, which is allowed to be smaller). The size of a zone must be larger than the largest input/output request that is allowed. The size of a zone must be smaller than the smallest partition in the linked volume. Thus, the size of a zone for one logical volume may be different than the size of a zone for another logical volume.

Figure 7:
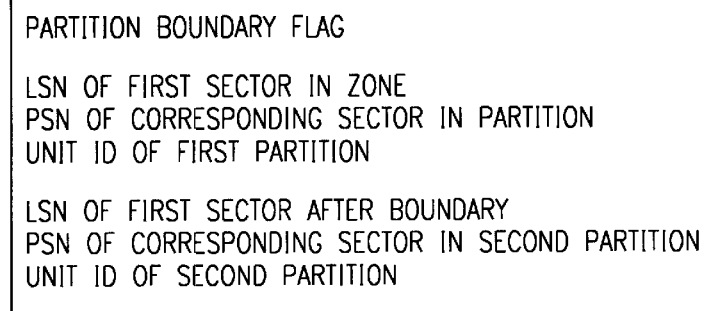
FIG. 7 depicts a sample entry in a zone table.

Each entry contains, at a minimum, the following information: a flag to indicate whether or not the zone crosses a partition boundary in the volume; which partition the zone starts on; and the information needed to translate an input/output request from LSNs to PSNs. The entry for a zone which crosses a partition boundary, such as zone 624 in FIG. 6, will also contain the LSN of the first sector in the zone which corresponds to a sector on the second partition in the zone as well as the PSN of that sector, the unit identification of the second partition in the zone, and the information needed to translate an input/output request from LSNs to PSNs for that partition. A sample entry in the zone table is depicted in FIG. 7.

Figure 8:
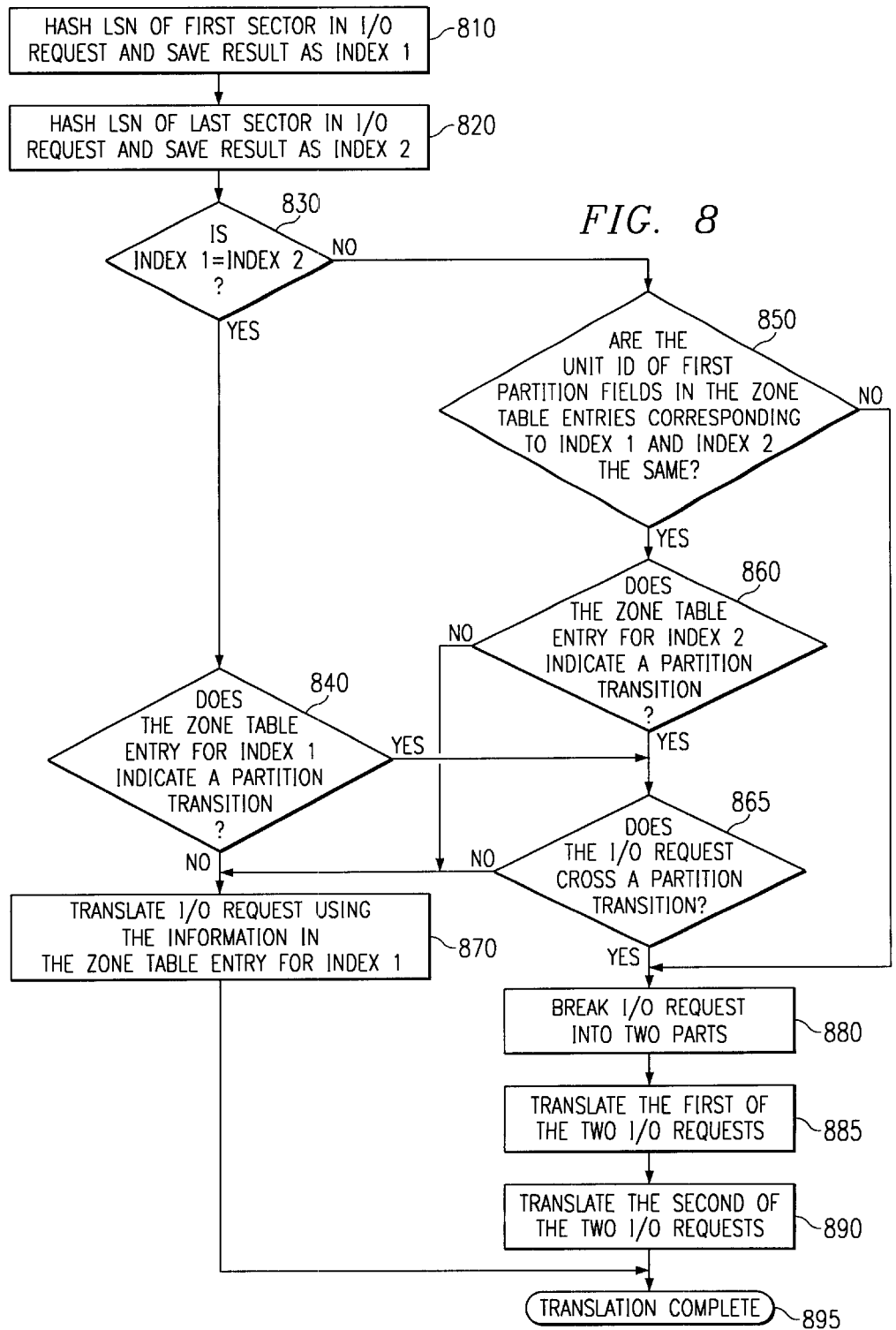
FIG. 8 depicts a flow chart of a preferred embodiment of the present invention.

A flowchart illustrating a preferred embodiment of a drive linking process in accordance with the present invention is shown in FIG. 8. As an input or output ("I/O") request is received, the Logical Sector Number ("LSN") of the first sector in the I/O request is hashed and saved as Index 1 (step 810). The LSN of the last sector in the I/O request is also hashed and saved as Index 2 (step 820). If Index 1 is not equal to Index 2 (step 830), then it is determined whether the unit IDs of the first partition in the zone table entries corresponding to Index 1 and Index 2 are the same (step 850). If the unit IDs are the same, then the zone table entry corresponding to Index 2 is examined to see if a partition transition lies within the zone (step 860). If a partition transition is indicated, the I/O request is examined to see if it crosses the partition transition (step 865). If it does, the I/O request is broken up into two parts (step 880) with each part containing that portion of the I/O request destined for a specific partition. Since each of the new I/O requests is now specific to a partition, they can be translated (steps 885 and 890), after which translation is complete (step 895).

If no partition transition is indicated in step 865, then the I/O request is translated using the information in the zone table entry for Index 1 (step 870). After this has been done, the translation is complete (step 895).

If, however, the unit IDs of the partitions in the zone table entries corresponding to Index 1 and Index 2 are not the same (step 850), then the I/O request is broken up into two parts (step 880). The first of the two I/O requests is translated (step 885). Next, the second of the two broken up I/O requests is translated (step 890). Following the translation of the second broken up I/O request, the translation is complete (step 895).

Returning back now to step 830, if Index 1 and Index 2 are equal, then it is determined whether the zone table entry for index 1 indicates a partition transition (step 840). If a partition transition is indicated, the I/O request is examined to see if it crosses the partition transition (step 865). If it does, the I/O request is broken up into two parts (step 880) with each part containing that portion of the I/O request destined for a specific partition. Since each of the new I/O requests is now specific to a partition, they can be translated (steps 885 and 890), after which the translation is complete (step 895).

If no partition transition is indicated in step 865, then the I/O request is translated using the information in the zone table entry for Index 1 (step 870). After this has been done, the translation is complete (step 895).

If Index 1 and Index 2 are equal (step 830) and it is determined that the zone table entry for Index 1 does not indicate a partition transition (step 840), then the LSN of the I/O request is translated to a PSN using the information in the zone table entry for Index 1 (step 870). Upon completion of step 870, the translation is complete (step 895).

By using a simple efficient hashing scheme to determine which drives (or partitions) an I/O request should be routed to, the present invention stabilizes access to the volume so that the performance of the system is relatively constant regardless of the number of partitions being linked. Furthermore, the present invention does not place any restrictions on the size or number of drives or partitions being linked. The present invention allows an I/O request to be routed to the correct drive in a relatively constant amount of time, thereby stabilizing performance and minimizing the penalty for using linked drives.

Although the present invention has been described primarily in terms of linking partitions together, it is equally applicable to linking drives as will be obvious to those skilled in the art. Furthermore, the linked drives do not have to be contained within one data processing system, but may be linked across a network such as an Intranet, a Local Area Network ("LAN"), or a Wide Area Network ("WAN") to give but a few examples.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for routing an input/output request for a particular logical volume, comprising the steps of:

assigning partitions to logical volumes, wherein an arbitrary number of partitions can be assigned to a logical volume and the partitions can be of an arbitrary size;

dividing each logical volume into a plurality of zones, wherein the zones for a particular logical volume are substantially equal in size;

creating a zone table whose entries contain data about one or two partitions that correspond to that zone; and responsive to receiving an input/output request directed to a logical volume, using the zone table entries to determine to which partitions in the logical volume the input/output request should be routed.

2. The method as recited in claim 1 further comprising using the zone table entries for a first and a last sector listed in the input/output request to determine to which partitions the input/output request should be routed.

3. The method as recited in claim 1 wherein a flag is set in the zone entry for a zone which crosses partitions and data on which partitions are crossed.

4. The method as recited in claim 1 wherein zones from a first logical volume can be a different size than zones from a second logical volume.

5. The method as recited in claim 1 wherein the logical sector number of the first sector in the input/output request is hashed and the logical sector number of the last sector in the input/output request is hashed to determine which zone entries to consult.

6. The method as recited in claim 1 wherein the partitions are located on a plurality of drives.

7. The method as recited in claim 1 wherein the plurality of drives are located on a plurality of data processing systems.

8. The method as recited in claim 1 wherein the plurality of drives are located within a network.

9. A computer software product including program instructions on a computer readable media for routing an input/output request to a particular logical volume, the computer software product comprising:

first instructions for assigning partitions to logical volumes, wherein an arbitrary number of partitions can be assigned to a logical volume and the partitions can be of an arbitrary size;

second instructions for dividing each logical volume into a plurality of zones, wherein the zones for a particular logical volume are substantially equal in size;

third instructions for creating a zone table whose entries contain data about one or two partitions that correspond to that zone; and fourth instructions, responsive to receiving an input/output request directed to a logical volume, for using the zone table entries to determine to which partitions in the logical volume the input/output request should be routed.

10. The computer software product as recited in claim 9 wherein said fourth instructions comprise using the zone table entries for a first and a last sector listed in the input/output request to determine to which partitions the input/output request should be routed.

11. The computer software product as recited in claim 9 wherein a flag is set in the zone entry for a zone which crosses partitions and data on which partitions are crossed.

12. The computer software product as recited in claim 9 wherein zones from a first logical volume can be a different size than zones from a second logical volume.

13. The computer software product as recited in claim 9 wherein the logical sector number of the first sector in the input/output request is hashed and the logical sector number of the last sector in the input/output request is hashed to determine which zone entries to consult.

14. The computer software product as recited in claim 9 wherein the partitions are located on a plurality of drives.

15. The computer software product as recited in claim 9 wherein the plurality of drives are located on a plurality of data processing systems.

16. The computer software product as recited in claim 9 wherein the plurality of drives are located within a network.

17. A system for routing an input/output request for a particular logical volume, comprising:

means for assigning partitions to logical volumes, wherein an arbitrary number of partitions can be assigned to a logical volume and the partitions can be of an arbitrary size;

means for dividing each logical volume into a plurality of zones, wherein the zones for a particular logical volume are substantially equal in size;

means for creating a zone table whose entries contain data about one or two partitions that correspond to that zone; and means, responsive to receiving an input/output request directed to a logical volume, for using the zone table entries to determine to which partitions in the logical volume the input/output request should be routed.

18. The system as recited in claim 17 further comprising means for using the zone table entries for a first and a last sector listed in the input/output request to determine to which partitions the input/output request should be routed.

19. The system as recited in claim 17 wherein a flag is set in the zone entry for a zone which crosses partitions and data on which partitions are crossed.

20. The system as recited in claim 17 wherein zones from a first logical volume can be a different size than zones from a second logical volume.

21. The system as recited in claim 17 wherein the logical sector number of the first sector in the input/output request is hashed and the logical sector number of the last sector in the input/output request is hashed to determine which zone entries to consult.

22. The system as recited in claim 17 wherein the partitions are located on a plurality of drives.

23. The system as recited in claim 17 wherein the plurality of drives are located on a plurality of data processing systems.

24. The system as recited in claim 17 wherein the plurality of drives are located within a network.

25. A method for routing an input/output request for a particular logical volume, comprising the steps of:

assigning partitions to logical volumes, wherein an arbitrary number of partitions can be assigned to a logical volume and the partitions can be of an arbitrary size;

dividing each logical volume into a plurality of zones, wherein the zones for a particular logical volume are substantially equal in size;

creating a hash table whose entries contain data about one or two partitions that correspond to that zone; and responsive to receiving an input/output request directed to a logical volume, using the hash table entries to determine to which partitions in the logical volume the input/output request should be routed.

26. A method for routing an input/output request to a particular drive partition wherein the partitions have been assigned to logical volumes and each logical volume has been divided into a plurality of zones, comprising the steps of:

receiving an input/output request directed to a logical volume; and responsive to said request, using a hash table to determine to which partitions in the logical volume the input/output request should be routed.

27. The method as recited in claim 26 further comprising using the hash table entries for a first and a last sector listed in the input/output request to determine to which partitions in the logical volume the input/output request should be routed.

* * * * *